United States Patent [19]
Kieffer

[11] 3,748,714
[45] July 31, 1973

[54] COIL INSERTION DEVICE
[75] Inventor: Vernon E. Kieffer, St. Louis, Mo.
[73] Assignee: Emerson Electric Co., St. Louis, Mo.
[22] Filed: Feb. 24, 1971
[21] Appl. No.: 117,918

[52] U.S. Cl.................. 29/205 R, 29/596, 29/606
[51] Int. Cl. ........................................ H02k 15/00
[58] Field of Search................ 29/596, 606, 205 R, 29/205 E, 205 D; 140/92.1, 93.3, 93

[56] References Cited
UNITED STATES PATENTS

| | | | |
|---|---|---|---|
| 2,934,099 | 4/1960 | Mason | 29/205 X |
| 3,507,029 | 4/1970 | Stuckey et al. | 29/596 X |
| 3,324,536 | 6/1967 | Hill | 29/205 |
| 3,579,818 | 5/1971 | Arnold | 29/205 |
| 2,432,267 | 12/1947 | Adamson | 29/205 X |
| 3,672,041 | 6/1972 | Arnold | 29/596 |

Primary Examiner—Charles W. Lanham
Assistant Examiner—Carl E. Hall
Attorney—Polster & Polster

[57] ABSTRACT

A coil assembling apparatus where prewound coils and strips of insulation are inserted axially into the slots of a stator core has an integral blade and stripper-impeller combination. Individual blades of the combination are interconnected by a curvilinear plate in a predetermined order, forming a series of magnet wire receivers between adjacent plates. The blades are arranged annularly and each plate connects two blades. The blades and plates form a solid base section which is fitted to a conventional actuator for mechanically driving the integral combination through the stator bore axially. The exterior surface of each blade is grooved and an individual stator tooth is positioned within the groove of each blade during the insertion process.

11 Claims, 5 Drawing Figures

PATENTED JUL 31 1973 3,748,714
SHEET 2 OF 3
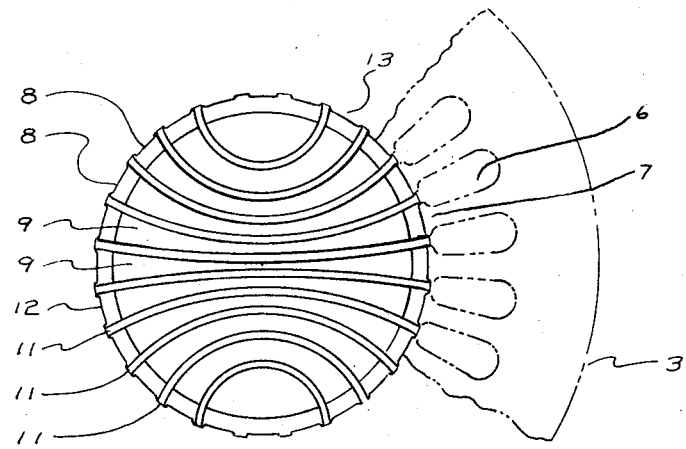
Fig-2-
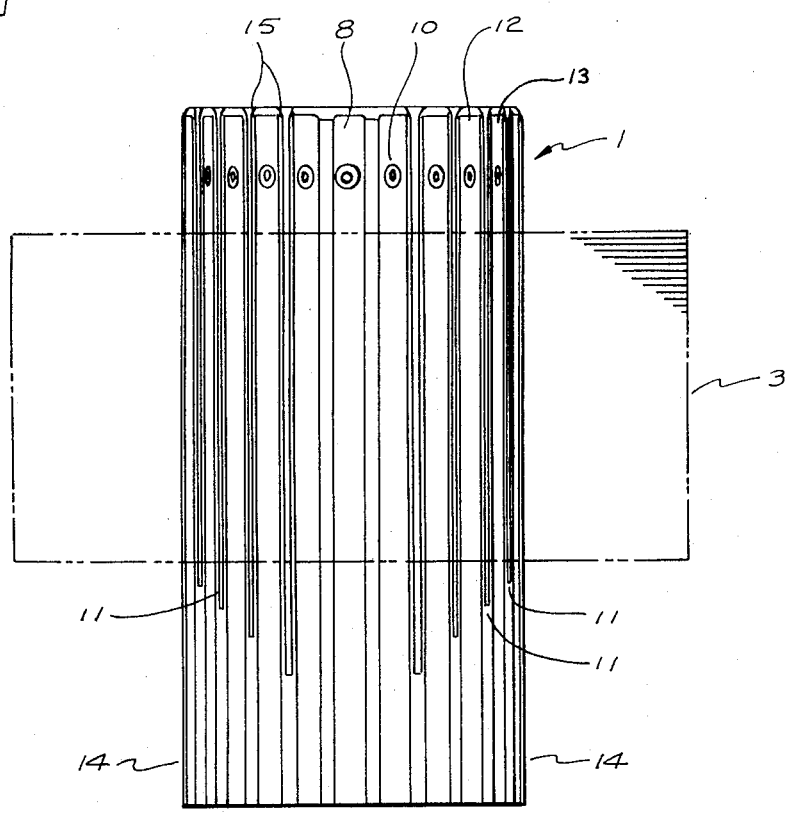
Fig-3-
INVENTOR
VERNON E. KIEFFER
Polster and Polster
ATTORNEYS

COIL INSERTION DEVICE

BACKGROUND OF THE INVENTION

This invention relates to coil assembly apparatus and in particular to a movable blade and stripper arrangement which inserts preformed coils in the stator slots of a dynamo electric machine.

Coil assembly apparatus similar to that described in the U.S. Patent to Hill, U.S. Pat. No. 3,324,536 is common throughout the electric motor industry. In general, the insertion machines based on this art have a cylindrical array of axially parallel fingers or blades mounted on a platform or base plate at one end and have a free end extending upwardly. The finger array is positioned so that each finger will cover the inside face of a single tooth of a stator core mounted on the array. The interior blade surface juxtapositioned with the tooth is grooved. A fluted impeller, commonly called a stripper, is slidably mounted within the finger array, and fillets of the stripper extend through gaps between the fingers. The stripper is mounted on the free end of a piston rod which pushes the stripper from a lower position several inches below the fixed end of the finger array through the bore of the stator. Additional mechanisms, in the form of wedge guide members, pusher rods, wedge magazine and guide rods are provided for inserting bore wedges simultaneously with winding insertion.

These prior art machines work well for their intended purposes. However, they suffer certain common deficiencies. Alignment of the fingers is critical. Finger misalignment can cause noninsertion or damage to the prewound coils. Wedge jamming occurs when the pusher rod and fingers interfere with one another.

Certain considerations, for example, access to machine parts, require that the prior art fingers, while being fixed at one end, be removably mounted at that fixed end. Consequently, they may work loose from their correct mounted position. The finger mounting may be compared with a cantilever, and forces applied at the free end are magnified at the fixed end, tending to misalign the fingers. Both prewound coils and stator cores are mounted from the free end of the fingers. Thus, the very steps necessary for machine operation, that is, the placement of coils and cores on the fingers, induce forces which tend to misalign the fingers. It follows that the longer the production run extends in time, the higher the probability of finger misalignment. The fixed finger prior art machine, in effect, has a major potential defect built into the machine.

Since the prewound coil has to slip over the free end of the fixed blade during the insertion process, a change in motor stack height requires an adjustment of the blade array. Adjustment of blade height, obviously, results in additional machine down time and resulting production loss.

One of the objects of this invention is to provide a device which prevents misalignment of the blade array.

Another object of this invention is to provide a device with improved wire insertion capability.

Yet another object of this invention is to provide a means for inserting prewound coils that reduces wire insulation damage.

Other objects will become apparent to those skilled in the art in the light of the following description and accompanying drawings.

SUMMARY OF THE INVENTION

In accordance with this invention, generally stated, a coil assembly apparatus is provided in which a blade array is combined with a stripper to form an impeller, which is attached to mechanical power means for driving the impeller. The blade surface in contact with the stator teeth has a grooved lead in it which extends over the edge of each stator tooth. Each blade in the impeller combination is interconnected predeterminately to another blade by a plate so as to define magnet wire receiving slots. The slots are open topped and have a staggered depth, closed bottom. The blade interconnection corresponds to the coil throw for the particular stator lamination being wound and the staggered depth provides sufficient end wire height for proper winding. A method of inserting prewound coils into the core of a dynamoelectric machine uses a movable blade impeller for driving the coils through the core axially.

BRIEF DESCRIPTION OF THE DRAWINGS

In the drawings,

FIG. 2 is an enlarged fragmentary top view of the combination coil insertion device shown in FIG. 1;

FIG. 3 is a view in side elevation of the combination coil insertion device shown in FIG. 2.

DESCRIPTION OF THE PREFERRED EMBODIMENT

Figure 1:
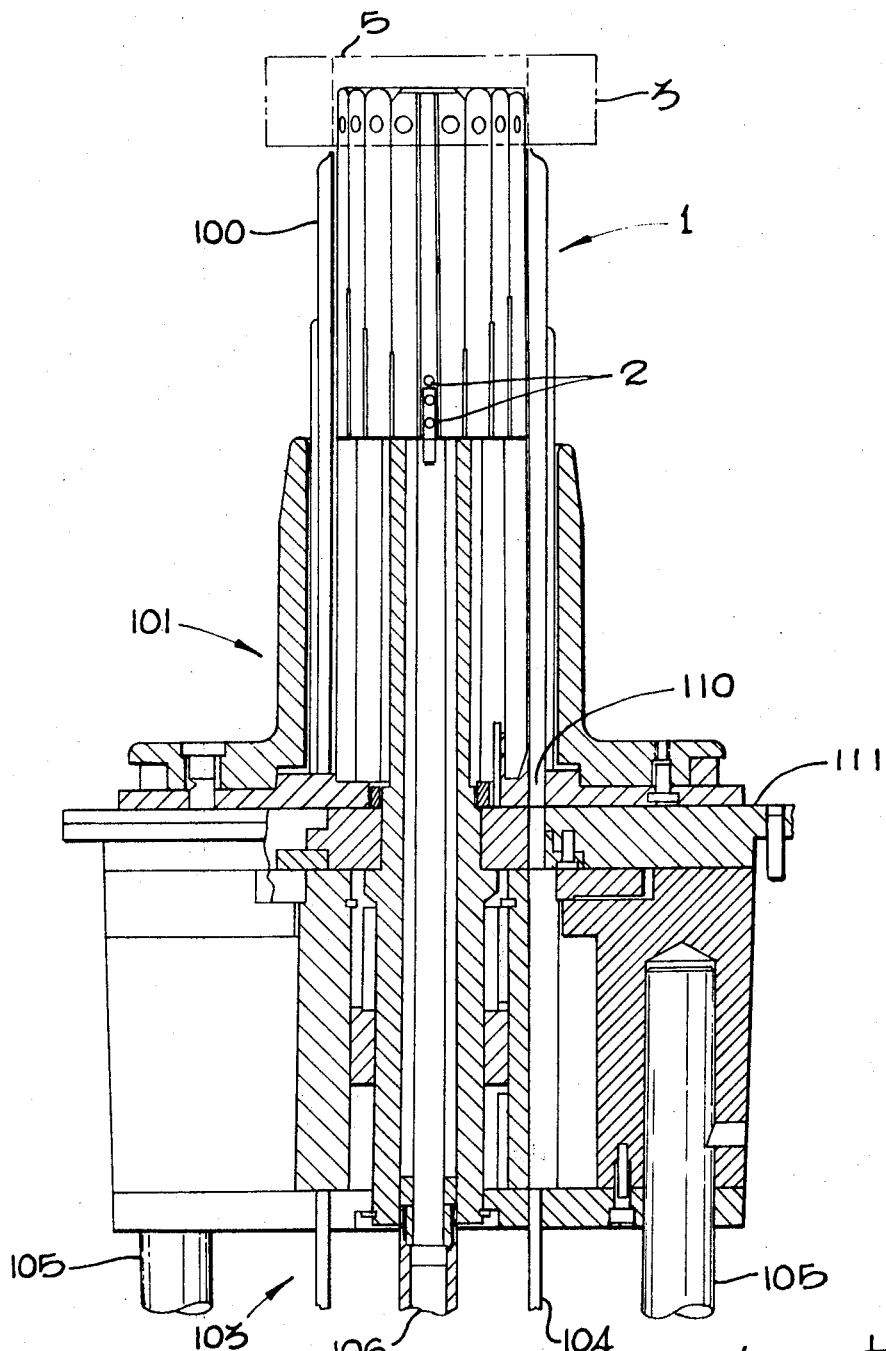
FIG. 1 is a view in side elevation partly in section and partly broken away of one illustrative embodiment of combination coil insertion device of this invention, incorporated in a coil insertion machine.

Referring now to FIG. 1, reference numeral 1 indicates one illustrative embodiment of combination coil insertion device of this invention installed in a conventional coil inserting apparatus. Commonly, these conventional machines include a plurality of wedge guide members 100 attached to a base 101. Base 101 is generally adapted to be removably mounted in position within an opening in a supporting platform 111 which supports and forms part of a housing for other operating mechanisms conventionally used in these machines. Base 101 may be removably mounted by any convenient method. A lower tooling assembly 103 includes pusher rods 104, guide rods 105 and a ram 106. Ram 106 is mechanically connected to an actuator, commonly air or hydraulic, not shown. Ram 106 reciprocates between a ram down and a ram up position, an insertion cycle starting from ram down to ram up and returning to ram down to complete the cycle. The apparatus may include a magazine and associated equipment for providing bore wedges simultaneously with coil insertion. A complete operation description of the conventional features of the insertion apparatus itself may be found in the above cited U.S. Patent to Hill, U.S. Pat. No. 3,324,536.

Insertion device 1 is attached to ram 106 by any conventional method. The preferred embodiment utilizes two groups of three tapped screws 2 spaced 180° apart. In the ram down, that is, the loading position of the machine, the free, upper end of insertion device 1 extends above the free end of wedge guide member 100. The insertion device is adapted for placement thereon of a stator core 3 of an electric motor or the like which is to have a plurality of prewound coils 4 placed therein. Core 3 conventionally has a circular bore 5 and axial slots 6 located in radial planes extending out from the bore 5. Slots 6 are defined and separated by teeth 7. The number of teeth and slots may vary, and their number depends on motor design considerations not here involved. By way of example, insertion device 1 has been constructed to accommodate a core having 24 teeth and 24 stator slots.

FIGS. 2 and 3 point out with particularity the concept of my invention. As there shown, coil insertion device 1 is constructed in part by a plurality of dynamic blades 8. In the embodiment illustrated, twenty-four blades 8 are arranged annularly and individually selected blades are interconnected by a plate 9. Two blades 8 are interconnected by each plate 9. Generally, plates 9 are curvilinear composites, but rectangular or other shaped plates may be required by certain blade interconnections. Blades and plates are joined together by a series of tapped screws 10 in the embodiment illustrated.

Each plate 9 has a discrete radius of curvature which is distinctly determined from considerations depending upon the particular stator lamination use with an individual coil insertion device 1. Thus, while a single device 1 is compatible with variable core heights in a particular stator lamination type, each separate stator lamination requires its own insertion device.

The plate and blade arrangement defines a series of magnet wire receiving slots 11 between adjacent plates and blades. Slots 11 are open topped and closed bottomed, and successive slots are of different depths. In the embodiments shown, successive slots are stepped with respect to the horizontal as best seen in FIG. 3. The staggered depth of the slot is important as it provides the correct end wire height for successful winding insertion.

The interconnection of blades 8 and plates 9 forms a solid base section 14 below the closed bottom of slots 11. Those skilled in the art will recognize that the depth of the slots 11 may change in different embodiments of my invention. That is, different stator core stack heights may require different slot 11 depths for proper insertion of the wire coil. Generally, however, the axial length of device 1 is such that it may be utilized with a range of stator core heights of a particular stator lamination.

The bottom of the slots 11 may comprise any of a variety of conventional components. Thus, each individual plate 9 may have a rabbet formed on one side of it which abuts the adjacent plate of the device 1, closing the slots 11. Likewise, the slots 11 may be closed by spacers placed between adjacent ones of the plates 9. Or, the slot bottoms may be partially formed by the blades and the plates 9, as the parts are joined in the assembly of the device 1. Other structural combinations may be utilized and all such combinations are intended to be encompassed by the scope of the appended claims.

Other embodiments of my invention may have additional physical connections between the blades 8 and the plates 9. For example, the blades and plates may be secured by some form of epoxy adhesive along the base section 14, if desired. Likewise, additional tapped screws 10 may be used along the base section 14. Similarly, the blades 8 may extend upwardly from an annular base portion having an axial opening therethrough and the plates may be inserted between the proper blades in either a press or shrink fit.

The exterior surfaces of blades 8 are important in the winding insertion function of this device. Referring to FIG. 3, an exterior surface 12 of blade 8 has a U-shaped groove 13 in it, the sides of which are defined by guide flanges 15. Each groove 13 of the annularly arranged blades 8 receives a stator tooth 7 during insertion. The blade construction is conventional. Because of tooth and groove engagement, wire receiving slots 11 open directly into the individual stator slots 6, as is best seen in FIG. 2.

Prior to their combination as an integral unit, both sides of the plates and blade portion in contact with the magnet wire of the prewound coils are polished. Consequently, there are no edges exposed which can nick the wire insulation.

Loading the device is simple. The machine operator places each coil in the proper magnet wire receiving slot 11. The distance between adjacent plates is made from a determination based on the wire size ranges used in motors designed from the stator lamination type under consideration. While this distance may vary, I prefer to have it sized to accept the largest wire size under consideration in a loose fit. The placement of the coils causes the individual turns of wire to fan or spread out. Wire fanning is responsible for one of the advantages of this device as the coils can be placed in the stator slots evenly without the tangled wires common with more conventional wire inserters. In addition, the fanned wire has greater support during insertion. Consequently, higher slot fill percentages, that is, the ratio of usable stator slot area to actual slot area used by the wire turns expressed as a percentage, are obtained.

Figure 4:
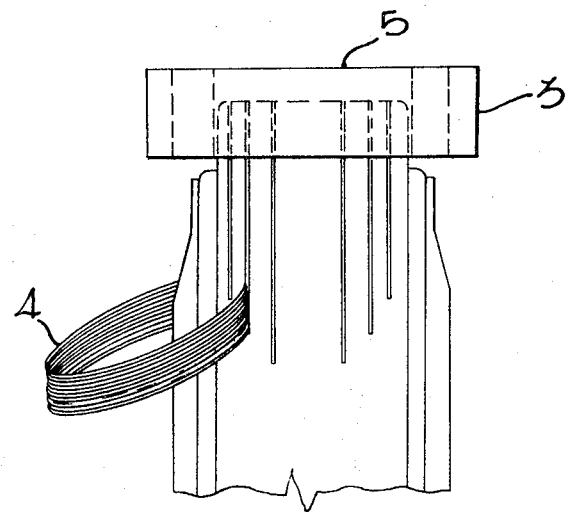
FIGS. 4 and 5 are fragmentary and somewhat diagrammatic illustrations depicting the functioning of the combination coil insertion device of this invention at successive stages in the axial insertion of prewound coils in a stator core.
Figure 5:
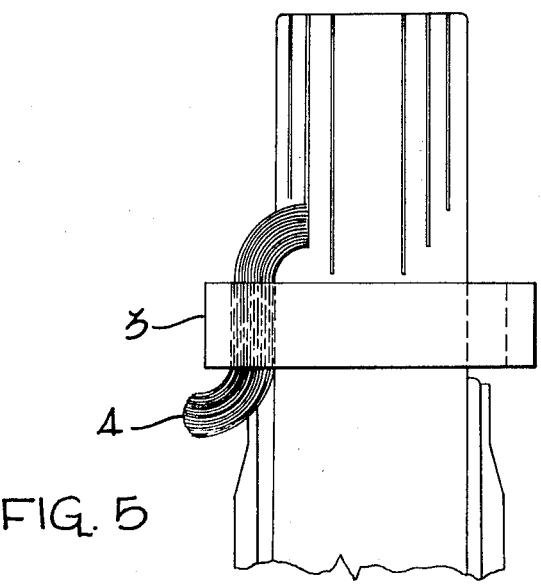

Stator core 3 is positioned after the prewound coil is loaded on the insertion device 1, as is graphically demonstrated in FIG. 4. It is conventional to prevent core movement by clamping the core during insertion by clamping means not shown. FIG. 5 demonstrates the extended, or ram up, position for insertion device 1. As device 1 is driven axially through the stator base, the wire expands into stator slots 6. Because the forces pulling the wire are distributed along the entire length of the end wire, there is less tension on individual wire turns and wire stretch is reduced.

Withdrawal of device 1 from its extended position allows the individual wire turns of the prewound coil to slide out the open top of receiving slots 11. Upon removal of the wound core, device 1 is ready for reloading. Conventional blocking steps are conducted on the inserted wire to place the end wire mass in more conventional form.

Numerous variations within the scope of the appended claims will occur to those skilled in the art in view of the foregoing description and accompanying drawings. While the preferred embodiment is made from steel, materials other than metals may be used in the construction of the device. The distance between adjacent plates or the depth of slots 11 may be varied. The number of blades and plates may be changed. For example, the 24 blade design described above is suitable for two pole A.C. induction machines. The blade and plate design necessarily varies as the number of poles is increased. The entire combination may be cast integrally rather than constructed into an integral combination. These variations are merely illustrative.

Having thus described the invention, what is claimed and desired to be secured by Letters Patent is:

1. A method of axially inserting a prewound coil into the core of a dynamoelectric machine comprising:
   placing a prewound coil on an axially movable coil insertion device; and
   reciprocating said coil insertion device through said core, whereby forward movement through said core deposits said coil in said core and rearward reciprocal movement removes said coil from said coil insertion device.

2. The method of claim 1 wherein said coil insertion device comprises a plurality of spaced plates and a plurality of blades arranged annularly about and attached to said plates to form an integral device having a plurality of slots defined between adjacent plates, said slots having opened tops and closed bottoms, interrupting adjacent blades gap fashion.

3. A coil insertion device comprising:
   a plurality of plates each having first and second ends and at least two spaced edges, each edge extending between said first and said second ends, said plates being spaced from one another along said first end and joined to one another along said second end to form a solid base section between adjacent plates, said base section being capable of movement with said plates but non-movable relative to said plates, said plates defining wire receiving slots between adjacent plates on said first end, said joined second end closing said slots, the number of said slots being sufficient to hold wire turns forming at least two poles of a dynamoelectric machine; a plurality of blades, one each of said blades being at-tached to each edge of said plates along at least said first end of said plates, the width of said blades being less than the combined widh of one of said plate edges and the width of one of the slots defined by adjacent plates for at least that portion of blade length extending along said first end of said plates.

4. The coil insertion device of claim 3 wherein said blades are arranged annularly and said plates are curvalinear, said combination forming an integral device.

5. The coil insertion device of claim 4 wherein said blades have grooves in their exterior surfaces.

6. The coil insertion device of claim 5 wherein said slots have varying depths.

7. The coil insertion device of claim 6 wherein one each of said blades is contiguous with each edge of said plates between said first and said second ends of said plates.

8. The coil insertion device of claim 7 wherein said blades and plates are manufactured integrally.

9. In an axial insertion machine for inserting prewound coils in a core assembly for a dynamoelectric machine, the improvement comprising a rigid bodied, coil insertion device including a plurality of plates each of which having at least first and second ends and spaced first and second edges extending from and between said first and said second ends, said plates being spaced from one another at said first end and joined to one another at said second end, said joined second end forming a solid base section no part of which is movable relative to said spaced plates, said spaced plates defining wire receiving slots at said first end, said solid base section closing said slots, the number of said slots being sufficient to hold wire turns forming at least two poles of said dynamoelectric machine, and a plurality of blades, one each of said blades being attached to each of said edges of said plates.

10. The improvement of claim 9 wherein said blades have grooves in their exterior surfaces, said grooves being adapted to engage the teeth of said core assembly.

11. The coil insertion device of claim 10 wherein said plates are curvalinear and said blades are arranged annularly to form said integral device.

* * * * *